Oct. 25, 1960  J. G. HART ET AL  2,957,193
CONTROL MECHANISM FOR WINDSHIELD WIPERS AND WASHERS
Filed Dec. 17, 1956  2 Sheets-Sheet 1

INVENTORS
John G. Hart
BY Kenneth A. Kosbab

M. H. Strickland
Their Attorney

United States Patent Office 2,957,193
Patented Oct. 25, 1960

2,957,193

CONTROL MECHANISM FOR WINDSHIELD WIPERS AND WASHERS

John G. Hart and Kenneth A. Kosbab, Rochester, N.Y., assignors to General Motors Corporation, Detroit, Mich., a corporation of Delaware Filed Dec. 17, 1956, Ser. No. 628,630

15 Claims. (Cl. 15—250.02)

This invention pertains to the art of windshield cleaning, and particularly to control mechanism for actuating a windshield wiper and a washer.

Heretofore, automobiles have been equipped with wiper units and washer units having independent controls. Moreover, it has been proposed, and commercially used, to incorporate means for operating the two units conjointly, as well as operating the wiper unit independently of the washer unit. Such an arrangement is shown in Patent No. 2,743,473. This invention relates to an improved coupler and coordinating mechanism for obtaining joint operation of a washer and wiper unit and to automatically discontinue, or restore control of the wiper unit to the manual control upon completion of operation of the washer unit. Accordingly, among our objects are the provision of improved coordinating means for controlling washer and wiper units; the further provision of improved coordinating means for wiper and washer units including means for automatically establishing a high speed setting for the wiper unit when the washer unit is actuated; and the still further provision of coordinating control mechanism for use with an electric wiper unit.

The aforementioned and other objects are accomplished in the present invention by providing a coordinator, or interconnecting system coupler, having a pair of pivotally mounted control arms that are operatively connected to a wiper motor actuator. Specifically, the control arms are fastened to a slider constituting the wiper motor control member by a pivot pin, and the control arms are free to rotate about this pivot pin. One control arm is connected by a Bowden wire to a manually operable wiper motor control knob. The other control arm is connected by a Bowden wire to a manually operable washer control member. The Bowden wire conduits are fastened to an adaptor, and when the wiper is off, the control arms are held against the adaptor by the Bowden wires. The coordinator, or interconnecting system coupler, can be actuated to turn on the wiper motor by either control arm as will be set forth more particularly hereinafter.

In the disclosed embodiment, the coordinator, or interconnecting system coupler, is shown associated with a slider for turning on or off an electric wiper motor. However, this is only by way of illustration, and is not to be construed as a limitation in the absence of a specific reference thereto in the claims appended hereto. In addition, the washer control member, in the illustrated embodiment, constitutes a pedal associated with a bellows type washer pump. This illustration is likewise only by way of example, since it is readily apparent that either an electric, vacuum or mechanically operated type of washer unit can be controlled, or connected with the coordinator of the present invention.

In operation, manual manipulation of the dash control knob for the wiper unit will effect movement of the Bowden wire so as to move one of the control arms outwardly about the pivot pin. The other control arm remains against the adaptor, and in moving the wiper control arm the slider for turning on the wiper is actuated. This slider can be positioned in any position from low to high speed if the motor is of the continuously variable speed type. On the other hand, if the motor has only a low or high speed setting, the operator can select whichever he desires. Similarly, when the manual wiper control is off, by depressing the pedal, conjoint operation of the washer and wiper unit will ensue, since the other control arm will actuate the slider and turn on the wiper, and upon completion of the delivery stroke of the washer pump, the wiper unit will be turned off.

When the washer unit is operated during wiper unit operation by manual control, the washer unit control arm will automatically position the slider so as to effect wiper motor speed at the high speed position. Upon completion of the washer unit delivery stroke, the wiper motor actuator will be returned to the speed setting it had before the washer unit was actuated. In other words, the mechanism of this invention automatically moves the wiper unit to the high speed position upon washer actuation, and returns the wiper unit to the preselected speed setting determined by the manual control knob.

Further objects and advantages of the present invention will be apparent from the following description, reference being had to the accompanying drawing wherein a preferred embodiment of the present invention is clearly shown.

Figure 1:
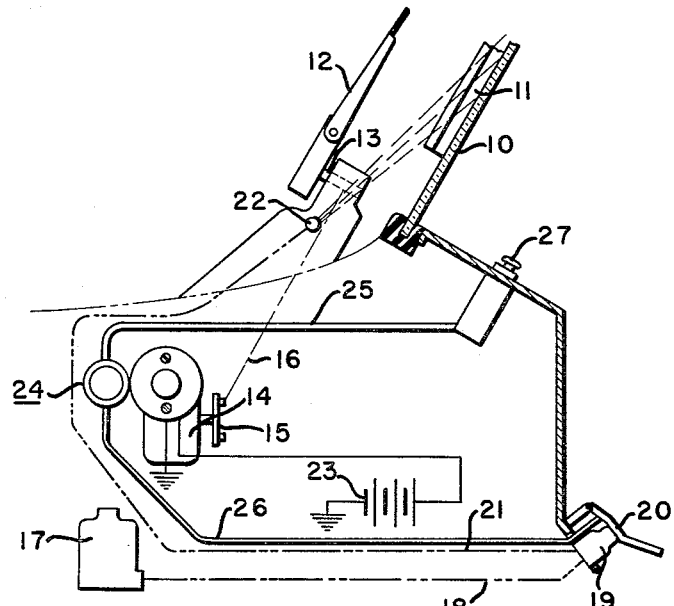
Figure 1 is a schematic layout of a washer-wiper system embodying the coordinator of this invention.

With particular reference to Figure 1, a motor vehicle having a washer unit and a wiper unit is schematically disclosed. The vehicle includes a windshield 10, the outer surface of which is adapted to be cleaned by a wiper assembly comprising a wiper blade 11 which is detachably connected to a wiper arm 12, not shown, the wiper arm being drivingly connected to a transmission shaft 13 which is oscillated so as to move the wiper blade 11 across the surface of the windshield by means of an electric motor driven motion converting mechanism depicted generally by the numeral 14. The electric motor driven wiper unit 14 includes an oscillatory output element 15 which may be connected by suitable means, such as a flexible cable 16 with the transmission shaft 13. The electric windshield wiper motor may be of the type shown in copending application Serial No. 551,800 filed December 8, 1955, now Patent No. 2,866,344, in the name of Elmer E. Reese and assigned to the assignee of this invention.

The vehicle also includes a reservoir for liquid solvent, depicted by the numeral 17. The solvent reservoir 17 is connected by a conduit 18 with a bellows type, foot operated washer pump. The bellows is depicted by numeral 19, and the pedal is depicted by numeral 20. The detailed construction of the foot operated washer pump is not disclosed herein since it forms no part of this invention. However, the foot operated washer pump may be of the type disclosed in copending application Serial No. 562,773 filed February 1, 1956, now Patent No. 2,899,901, in the name of Kenneth A. Kosbab and assigned to the assignee of this invention. Thus, the pump bellows 19 is connected by a discharge conduit 21 to a conventional washer knob arranged to spray liquid solvent onto the windshield 10 into the path of the moving wiper blade 11.

The wiper motor 14, and alluded to hereinbefore, is of the electric motor driven type, and the control means therefor includes a slider, not shown in Figure 1. The slider, as will be pointed out more particularly hereinafter, controls switch means for turning on and off the wiper motor as well as for selecting the speed setting thereof. Thus, the vehicle installation includes a battery 23 which is connected by suitable wires with the wiper motor switch.

The novel coordinator, or interconnecting system coupler, is depicted schematically in Figure 1 by numeral 24. The coordinator 24 has associated therewith two Bowden control wires 25 and 26. Control wire 25 is operatively connected with a dashboard knob 27. Control wire 26 is operatively connected with the pedal 20 of the washer unit.

Figure 2:
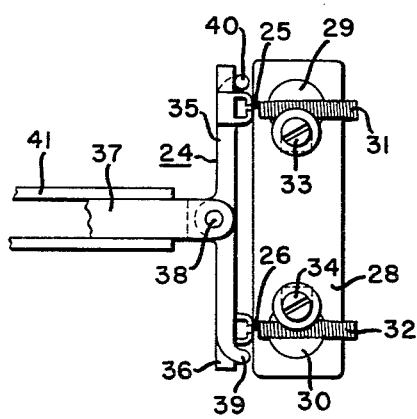
Figure 2 is a plan view of the novel coordinator of this invention.
Figure 4:
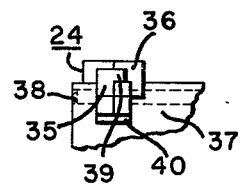
Figure 4 is a view taken in the direction of arrow 4 in Figure 3.

With particular reference to Figures 2 and 4, the detailed construction of the unique coordinator, or interconnecting system coupler, will be described. As seen in Figure 2, the coordinator 24 includes an adaptor 28 having a pair of rotatable plugs 29 and 30 therethrough. The rotatable plug 29 accommodates the conduit 31 of the Bowden wire 25. The Bowden wire conduit 31 is rigidly attached to the rotatable plug 29 by means of a screw 33. The Bowden wire 26 likewise includes a conduit 32 which is rigidly attached to the rotatable plug 30 by means of a screw 34. The Bowden wire 25 is attached to a control arm 35. The Bowden wire 26 is attached to a control arm 36. The rotatable plugs 29 and 30 permit angular movement of the Bowden wire conduits 31 and 32. The control arms 35 and 36 are fastened to a slider 37 by means of a pivot pin 38, the arms 35 and 36 being coaxially mounted by the pin 38 so as to be free to rotate thereabout.

Figure 3:
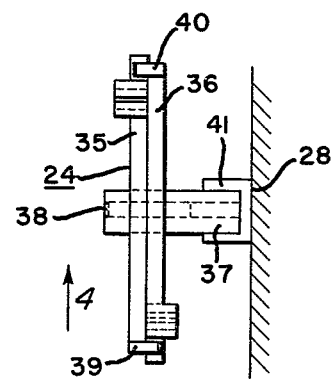
Figure 3 is a side view of the coordinator shown in Figure 2.

The slider 37 controls the switch mechanism for the electric windshield wiper motor 14. As seen particularly in Figure 3, the control arm 36 has an offset gear 40 which overhangs one end of the control arm 35. In addition, the control arm 35 has an offset gear, or tang, 39 which overhangs one end of the control arm 36. The slider 37 is arranged for reciprocable movement within a guide 41.

Figure 5:
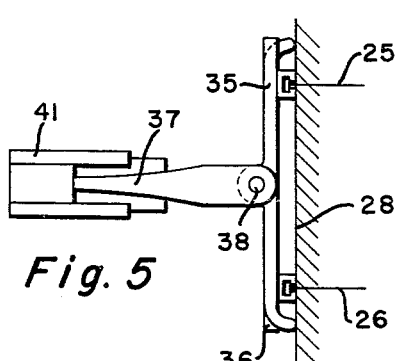
Figures 5 through 8 are diagrammatic views illustrating the various modes of operation of the novel coordinator of this invention.

With particular reference to Figures 5 through 8, the operation of the unique coordinator, or interconnecting system coupler, of this invention will be described. When both the hand actuator 27 for the wiper unit, and the washer actuator 20 for conjoint operation of the wiper unit and the washer unit, are in the off position, as shown in Figure 1, the Bowden wire conduits 31 and 32 respectively, maintain the control arms 35 and 36 in contact with the adaptor 28 as shown in Figure 5 in the drawing. Thus, the slider 37 is in the off position, and hence the wiper motor 14 is deenergized.

Should the operator desire to effect operation of the windshield wiper unit alone, the hand actuator, or dashboard knob, 27 is turned, or pulled, depending upon the motion converting mechanism between the knob and the Bowden wire 25. In either event, when the knob 27 is actuated, the Bowden wire 25 as viewed in Figure 5 is moved to the position shown in Figure 6. This movement of the Bowden wire 25 causes the control arm 35 to pivot about the pin 38, while the other end of the control arm 35 remains in contact with the adaptor 28. It is pointed out that the knob 27 may be manipulated so as to select either the low or high operating speed of the wiper motor, or in situations where the motor speed is continuously variable, any desired speed can be selected by manipulation of the knob 27. When it is desired to interrupt operation of the wiper unit, the control knob 27 is actuated in the opposite direction so as to pull the Bowden wire 25 from the position of Figure 6 to the position of Figure 5 so as to return the slider 37 to the off position.

Figure 7:
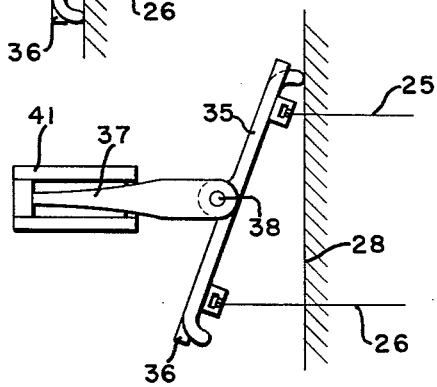

Referring particularly to Figures 5 and 7, when the manually operable wiper actuator knob 27 is in the off position, the wiper unit can be turned on and off by the washer actuator 20. Thus, when the pedal 20 is depressed, the Bowden wire 26 is extended so as to move the control arm 36 about the pivot point 38 and move the slider 37 to the high speed position. Of course, at this time, the control arm 35 is maintained in contact with the adaptor 28 by the Bowden wire 25. Simultaneously with depression of the pedal 20 to activate the wiper motor 14, the delivery stroke of the washer pump 19 is commenced so that water will be sprayed onto the windshield 10 through the nozzle 22 and into the path of the moving wiper blade 11. It is pointed out that wiper operation will not terminate immediately after cessation of the delivery stroke of the washer pump, since the flexible bellows has to expand due to its natural recovery characteristic, and only when the bellows is fully expanded will the control wire 26 be moved to the position of Figure 5 to deenergize the wiper motor 14. In addition, it is pointed out that during conjoint washer wiper operation, the wiper motor is operated at high speed.

Figure 8:
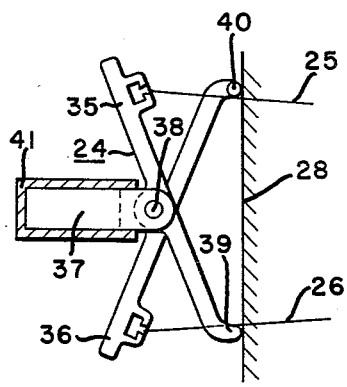

As shown in Figure 8, the manual control actuator 27 has adjusted the Bowden wire 25 so as to move control arm 35 to the high speed position. Thus, the slider 37 is already in the high speed position. When the pedal 20 is depressed, the Bowden wire 26 actuates control arm 36, but the net result does not affect the position of slider 37. This arrangement is possible, since the hooked ends 39 and 40 respectively, of control arms 35 and 36 do not retain either of the other control arms in position. Upon completion of the delivery stroke of the washer pump, the natural recovery characteristic of the washer pump to accomplish the intake stroke, will move the Bowden wire 26 back to the position of Figure 6, but wiper operation will continue under manual control.

Figure 6:
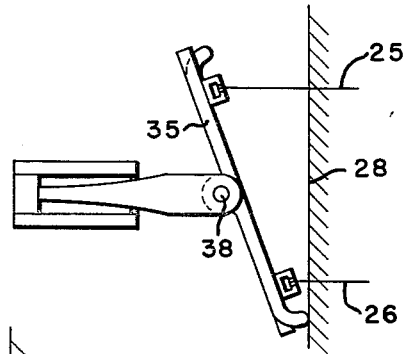

Assuming now that the manual control actuator 27 for the wiper control is moved to the intermediate position, that is, the slider 37 is disposed between the off position shown in Figure 5 and the high speed position shown in Figure 6. When the pedal 20 is depressed, the Bowden wire 26 will move the control arm 36 to the position shown in Figure 8. Thus, the control arm 36 will be moved until the rod, or tang end 40 engages the adaptor 28 at midstroke. At this point the hooked end of 40 bearing against the adaptor 28, will cause the slider 37 to move in the guide 41 to the full on speed position. As the slider 37 moves to the left, the end 39 of the control arm 35 will move away from the adaptor 28 pivoting about pin 38. This will occur since the slot end of arm 35 wherein the Bowden wire 25 is situated, is held stationary by the Bowden wire 25. When the washer Bowden wire 26 returns under the control of the bellows 19, it will pivot the arm 36 about pin 38 moving the rod end 39 away from the adaptor 28 until it engages the slot end of arm 35 at midstroke. At this point, the slot end of arm 36 will contact the rod end 39 of arm 35. The mechanism will then fulcrum about the slot, or Bowden wire connection end of arm 35 which is held stationary by the Bowden wire 25. Thus, the slider 37 will move in guide 41 to its initial preset position, for instance half stroke or low speed. When the Bowden wire connection end of arm 36 and the rod end 39 of the arm 35 return to the initial position the washing cycle will be completed. Thus, the system will operate in the aforegoing manner for any initial setting of the dashboard knob 27.

From the foregoing it is manifest that the present invention provides a unique coordinator, or interconnecting system coupler, for effecting conjoint or independent operation of a wiper unit and a washer unit. Moreover, the coordinator of this invention is extremely simple and operates in a positive and effective manner so as to coordinate the control of a washer unit and a wiper unit of any design.

While the embodiment of the present invention as disclosed herein constitutes a preferred form, it is generally understood that other forms might be adopted.

What is claimed is as follows:

1. A windshield cleaning system including, a washer unit, a wiper unit including a motor and a control therefor, a pair of independently movable members, each member having a two-way driving connection with said wiper control, manual means for actuating one of said members to effect independent operation of said wiper unit, and a common control operable to set said washer unit in operation and to set said wiper unit in operation for conjoint operation through actuation of said other member.

2. A windshield cleaning system including, a washer unit, a wiper unit including a motor and a control therefor, a coordinator connected to said wiper unit control including a pair of relatively movable members, each member having a two-way driving connection with said wiper unit control, manual means for moving one of said coordinator members to effect independent operation of said wiper unit, and a common control operable to position the other of said coordinator members to set said wiper unit in operation and set said washer unit in operation to effect conjoint operation of both units.

3. A windshield cleaning system including a washer unit, a wiper unit including a motor and a control therefor, a coordinator connected to said wiper unit control, said coordinator including a pair of relatively movable members having an operative connection with each other and connected to said wiper unit control, manual means for positioning one of said coordinator members to effect independent operation of said wiper unit, and a common control operable to position the other of said coordinator members to effect operation of said wiper unit at high speed and effect operation of said washer unit to operate both units conjointly.

4. A windshield cleaning system including, a washer unit, a wiper unit including a motor and a control therefor, a coordinator connected to said wiper unit control including a stationary adaptor and a pair of coaxially mounted relatively pivotable members having reaction points on said stationary adaptor, manual control means connected with one of said coordinator members for effecting independent wiper unit operation, and a common control operable to set both units in operation conjointly connected to the other of said coordinator members.

5. A windshield cleaning system including a washer unit, a wiper unit including a motor and a control therefor, a coordinator connected to said wiper unit control including a stationary adaptor and a pair of coaxially mounted, relatively pivotable members having reaction points on said stationary adaptor, said members being pivoted to a reciprocable control for said wiper unit, manual means operatively connected with one of said coordinator members for effecting independent operation of said wiper unit, and common control means operable to set both units in operation conjointly connected to the other of said coordinator members.

6. A windshield cleaning system including, a washer unit, a wiper unit including a motor and a control therefor, a coordinator operatively connected to said wiper unit control including a stationary adaptor and a pair of coaxially mounted, relatively movable members having reaction points on said stationary adaptor, said members being pivoted to said wiper unit control which is arranged for lineal movement, manual means operatively connected with one of said coordinator members for effecting independent operation of said wiper unit, and common control means connected to the other coordinator member for effecting operation of said wiper unit and effecting operation of said washer unit to operate both units conjointly.

7. A windshield cleaning system including, a wiper unit including a motor and a control therefor, a washer unit including means for spraying a solvent onto an associated windshield, a coordinator connected to said wiper unit control including a stationary adaptor, a pair of relatively movable members which react against said adaptor, both of said members being connected to said wiper unit control, manual means for actuating one of said members to effect independent operation of said wiper unit, and common control means connected to said other coordinator member to effect operation of said wiper unit and operation of said washer unit to operate both units conjointly.

8. A windshield cleaning system including, a washer unit, a wiper unit including a motor and a control therefor, a coordinator connected to the wiper unit control including, a stationary adaptor, a pair of coaxially mounted relatively movable members connected to said control for the wiper unit, common pivot means for said members, said members having reaction points on said stationary adaptor, manual means connected to one of said coordinator members for effecting pivotal movement thereof to effect wiper unit operation independent of the washer unit, and common control means connected to the other coordinating member to effect operation of said washer unit to operate both units conjointly.

9. A windshield cleaner system comprising, a washer unit, a wiper unit including a motor and a control therefor, a coordinator connected to the wiper unit control including a stationary adaptor, a pair of coaxially mounted relatively movable members, and means pivotally interconnecting said members, said last recited means being connected to said wiper unit control, said members having reaction points on said stationary adaptor, manual means connected to one of said members for securing independent operation of said wiper unit at any desired speed, common control means connected to the other coordinator member for effecting operation of said wiper unit at high speed and effecting operation of said washer unit to operate both units conjointly.

10. A windshield cleaning system comprising a washer unit, a wiper unit including a motor and a control therefor, a coordinator operatively connected to the wiper unit control comprising a pair of pivotally mounted relatively movable members, a stationary adaptor, a pin pivotally interconnecting said members, said pin being connected to said wiper unit control, said relatively movable coordinator members having reaction points on said stationary adaptor and interengaging portions adapted for simultaneous movement under certain conditions, manual means connected to one of said coordinator members for securing independent wiper unit operation, and common control means connected to the other of said coordinator members for effecting operation of said wiper unit at high speed and effecting operation of said washer unit to operate both units conjointly.

11. A coordinator for a control of a wiper unit arranged to give either independent operation of the wiper unit or conjoint operation of the wiper unit and a washer unit, including, a pair of relatively movable members, each member having a two-way driving connection with said wiper unit control, means for actuating one of said members to secure independent wiper unit operation, and means for actuating the other of said members to effect operation of the wiper unit and effect operation of the washer unit to operate both units conjointly.

12. A coordinator for a control of a wiper unit arranged to effect either independent operation of the wiper unit or conjoint operation of the wiper unit with a washer unit, including, a stationary adaptor, a pair of coaxially mounted, relatively movable control members which react against said stationary adaptor, common pivot means for said control members, said pivot means being connected to said wiper unit control, means connected to one of said members for effecting movement thereof so as to secure independent wiper unit operation, and means connected to the other of said members for effecting operation of said wiper unit and effecting operation of said washer unit to operate both units conjointly.

13. A coordinator for the control of a wiper unit for enabling independent operation of the wiper unit or conjoint operation of the wiper unit with a washer unit, including, a stationary adaptor, a pair of coaxially mounted, relatively movable members having reaction points on said stationary adaptor, common pivot means connecting said members, said common pivot means being connected to said wiper unit control, means connected to one of said members for pivoting the same to effect independent wiper unit operation, and means connected to the other of said members for pivoting the same to effect operation of said wiper unit and effect operation of said washer unit to operate both units conjointly.

14. A coordinator for the control of a wiper unit capable of effecting independent operation of the wiper unit or conjoint operation of the wiper unit and the washer unit including, a stationary adaptor, a pair of coaxially mounted relatively movable members, common pivot means for said members, said members having reaction points on said stationary adaptor, said common pivot means being connected to said wiper unit control which comprises a reciprocable slider disposed in a guide, means connected to one of said coordinator members for effecting movement thereof to secure independent wiper unit operation, and means connected to the other of said coordinator members for effecting movement thereof to effect operation of said wiper unit and effect operation of said washer unit to operate both units conjointly.

15. A coordinator for the control of a wiper unit to secure either independent operation of the wiper unit or conjoint operation of the wiper unit with a washer unit, including, a stationary adaptor, a pair of coaxially mounted relatively movable members which react against said stationary adaptor, common pivot means interconnecting said members and said wiper unit control which comprises a reciprocable slider disposed for movement in a guide, a first Bowden wire connected to one of said control members and movable to secure independent wiper unit operation, and a second Bowden wire secured to the other control member for effecting movement thereof to effect operation of said wiper unit and effect operation of said washer unit to operate both units conjointly.

References Cited in the file of this patent

UNITED STATES PATENTS

| | | |
|---|---|---|
| 2,270,573 | Avery | Jan. 20, 1942 |
| 2,743,473 | Oishei | May 1, 1956 |
| 2,816,316 | Oishei | Dec. 17, 1957 |
| 2,869,164 | Neufeld | Jan. 20, 1959 |